June 7, 1938.  J H. HUNT  2,119,991
VEHICLE WHEEL
Filed July 5, 1934
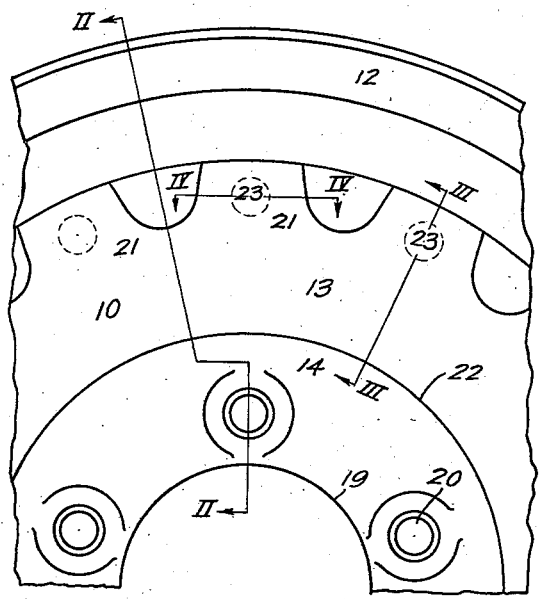
Fig. I
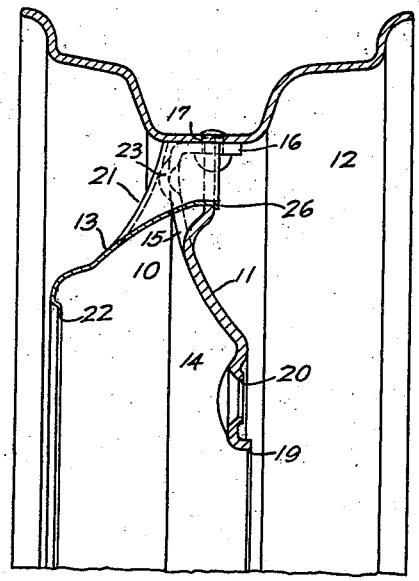
Fig. II
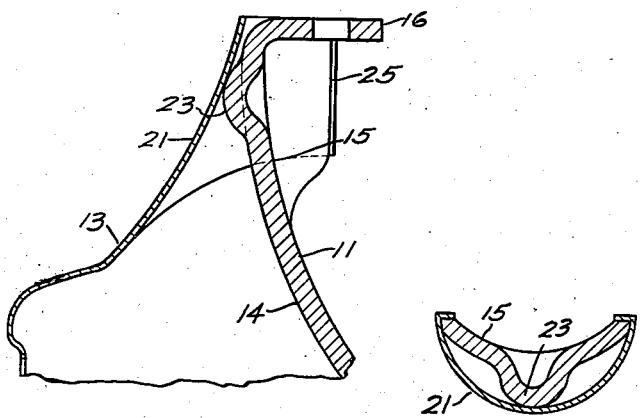
Fig. III    Fig. V
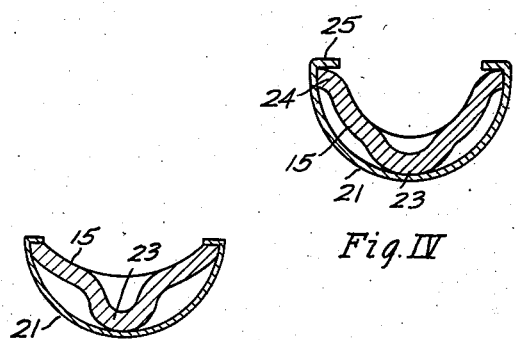
Fig. IV
INVENTOR.
J. Harold Hunt.
BY
Carroll R. Taber
HIS ATTORNEY.

Patented June 7, 1938

2,119,991

UNITED STATES PATENT OFFICE 2,119,991

VEHICLE WHEEL

J Harold Hunt, Lansing, Mich., assignor to Motor Wheel Corporation, Lansing, Mich., a corporation of Michigan Application July 5, 1934, Serial No. 733,833

3 Claims. (Cl. 301—64)

This invention relates to wheels and more particularly to wheel bodies of the double disk spoked type.

The principal object of the invention is the provision of means for assembling a pair of disks whereby the spoke portions thereof may be securely connected to each other and held against relative movement regardless of the shape of the spoke portions of the two disks. This object is attained by providing the spokes of one of the disks with axially extending spacers or projections adapted to contact the inner surface of the corresponding spoke of the other disk. Thus the front walls of the corresponding spokes of the disks may be spaced axially from each other without requiring any special assembling tools and without danger of relative movement after assembly.

The preferred embodiment of the invention is illustrated in the accompanying drawing, wherein:

Figure I is a partial front view of a wheel;

Figure II is a sectional view taken on the line II—II of Figure I;

Figure III is a sectional view of the wheel body only, taken on the line III—III of Figure I;

Figure IV is a sectional view taken on the line IV—IV of Figure I; and

Figure V is a sectional view similar to Figure IV showing a modified form of spoke construction.

The wheel illustrated in Figure I comprises a wheel body 10 having a rim 12 mounted on the periphery thereof. The wheel body consists of a relatively flat inner load supporting disk 11 and an outer decorative disk 13 of generally frustroconical form. The inner disk 11 includes a central wheel attaching zone 14 and a plurality of radially extending arms 15.

The arms 15 form spoke portions of shallow channel shape in cross section. They are provided with flanges 16 at their outer extremities to which the rim 12 is secured by means of rivets 17. The central zone 14 of disk 11 is provided with a large opening 19 for the reception of a conventional wheel hub and a plurality of smaller openings 20 for the reception of conventional wheel attaching studs.

The outer disk 13 consists of a nave portion and a plurality of deeply channeled spokes 21 extending radially outward therefrom. The front walls of the spokes are preferably flared axially outward toward the nave whereby the latter is spaced axially from the central zone of the disk 11. The nave portion of disk 13 is provided with a large central opening 22 adapted to be closed by a removable hub cap, not shown.

The spokes 21 of disk 13, as best shown in Figure II, are of considerable axial depth. They correspond in number to the spoke portions 15 of disk 11. The two disks are assembled with each of the spokes 21 embracing an adjacent spoke portion 15.

Spoke portions 15 are provided adjacent their outer extremities with axially outwardly extending integral projections 23. These serve to properly space the two disks during the assembling operation, support the outer disk in the completed assembly and aid in preventing relative movement of the two disks when assembled in a completed wheel structure. Separate spacer elements may be substituted for the integral projections 23, if desired, although the latter are preferred.

The outer disk 13 is secured to the inner disk 11 by flanging the side walls of spokes 21 over the edges 24 of spoke arms 15 as indicated at 25. The walls between spokes 21 are also flanged over the edge portions between spoke arms 15 as indicated at 26. In this manner the disk 13 is securely connected to the disk 11 with the inner surface of the front walls of the spokes 21 contacting the projections 23.

By the provision of spacer projections 23 the shape and form of spokes may be varied as desired without impairment of the wheel body construction. Likewise, the spoke arms 15 may be substantially flat if desired, in which case the projections 23 will be of greater axial extent as indicated in Figure V. A shallow channel shape, at least, is preferred for spoke arms 15 in order to provide the necessary strength and rigidity.

The scope of the invention is indicated in the appended claims.

I claim:

1. In a vehicle wheel, a wheel body comprising inner and outer stampings provided with cooperating channeled spokes, the lateral edges of each pair of cooperating spokes being secured to each other and the portions intermediate the edges being held in spaced relation to each other except for a substantially point contact therebetween provided by a projection secured to one and contacting the other of said spokes, said projection being located remote from the ends and lateral edges of the spokes and serving to space the adjacent surfaces thereof from each other.

2. In a vehicle wheel, a wheel body comprising inner and outer stampings provided with cooperating channeled spokes, the channels of each stamping opening in the same direction and having the lateral edges of each pair of cooperating spokes secured to each other, the portions intermediate the edges being held in spaced relation to each other except for a substantially point contact therebetween provided by a projection secured to one and contacting the other of said spokes, said projection being located remote from the ends and lateral edges of the spokes and serving to space the adjacent surfaces thereof from each other.

3. In a vehicle wheel, a wheel body comprising inner and outer stampings provided with cooperating channeled spokes, the lateral edges of each pair of cooperating spokes being secured to each other and the portions intermediate the edges being held in spaced relation to each other except for a substantially point contact therebetween provided by a projection formed integrally with one and contacting the other of said spokes, said projection being located remote from the ends and lateral edges of the spokes and serving to space the adjacent surfaces thereof from each other.

J HAROLD HUNT.